United States Patent

Ono et al.

[11] Patent Number: 5,747,565
[45] Date of Patent: May 5, 1998

[54] POWDER COATING COMPOSITION

[75] Inventors: Kazuya Ono, Tokyo; Akira Yasuda, Soka; Katsuji Kitagawa, Kasukabe, all of Japan

[73] Assignee: Somar Corporation, Japan

[21] Appl. No.: 26,183

[22] Filed: Mar. 1, 1993

Related U.S. Application Data

[63] Continuation of Ser. No. 655,023, Feb. 14, 1991, abandoned.

[30] Foreign Application Priority Data

Feb. 23, 1990 [JP] Japan ........................ 2-43603

[51] Int. Cl.$^6$ .................... C08L 63/00; C08F 8/00
[52] U.S. Cl. .............. 523/413; 523/443; 525/107; 525/526; 525/530; 525/934
[58] Field of Search ...................... 523/413, 443; 525/934, 526, 530, 107

[56] References Cited

U.S. PATENT DOCUMENTS

| | | | |
|---|---|---|---|
| 4,009,223 | 2/1977 | Noonan | 525/934 |
| 4,420,605 | 12/1983 | Kaufman | 525/934 |
| 4,482,660 | 11/1984 | Minamisawa et al. | 525/113 |
| 4,581,293 | 4/1986 | Saunders | 523/443 |
| 4,695,598 | 9/1987 | Yamamoto et al. | 525/524 |
| 4,732,702 | 3/1988 | Yamazaki et al. | 252/512 |
| 4,804,710 | 2/1989 | Nakata et al. | 525/111 |
| 5,017,632 | 5/1991 | Bredoow | 523/413 |

FOREIGN PATENT DOCUMENTS

| | | |
|---|---|---|
| 59-051910 | 3/1984 | Japan . |
| 62-132974 | 6/1987 | Japan . |

*Primary Examiner*—Randy Gulakowski
*Attorney, Agent, or Firm*—Lorusso & Loud

[57] ABSTRACT

A powder coating composition is disclosed which includes (a) 100 parts by weight of a mixed epoxy resin having an epoxy equivalent of 800–2000 and containing (a-1) a diglycidyl ether of bisphenol A having an epoxy equivalent of 180–2500 and (a-2) a rubber-modified epoxy resin having an epoxy equivalent of 180–2500 and obtained by reaction of a diglycidyl ether of bisphenol A with a carboxyl terminated acrylonitrile-butadiene copolymer; (b) a mixed curing agent consisting of (b-1) 0.05–5 parts by weight of an imidazole compound, (b-2) 0.5–10 parts by weight of dicyanodiamide and (b-3) 1–10 parts by weight of a dihydrazide of a dibasic carboxylic acid; and (c) 50–100 parts by weight of silica.

4 Claims, No Drawings

POWDER COATING COMPOSITION

This application is a continuation of application Ser. No. 07/655,023, filed Feb. 14, 1991, now abandoned.

This invention relates to a powder coating composition which gives a coating having both high adhesion to a solid surface on which the coating is applied and high resistance to thermal shock and which is penetrable into small gaps when fused.

Liquid epoxy resin compositions are now used for the packaging, casting, encapsulation, sealing or potting of various electronic and electric parts. Because of their good penetrability, the liquid epoxy resin compositions are also used for consolidating rotor coils of motors and generators and for bonding the coils to the rotor cores around which the coils are wound. However, while the rotor coils may be easily impregnated with liquid epoxy resins, good coatings are not formed on the surfaces of the rotors. Packaging of rotors is also effected using liquid epoxy resins.

Powder coating compositions, too, are applied for impregnation and binding of coils. However, known powder coating compositions are not satisfactory because strong adhesion between the coil windings and between the coils and the core is not obtained. Further, with the known powder coating compositions, it is difficult to obtain both sufficient penetration into coil windings and good coatings on the surfaces of the rotors.

In packaging rotors with a powder coating composition, it is generally important that the coating composition should exhibit good balance in gellating time and penetrability in order to obtain good coating on the surface of the rotors and good fixation of coil windings. Namely, with a powder coating composition having high penetrability, the coating on the surface becomes poor though the coil windings can be sufficiently bonded therewith. In this case, it is necessary that the gellating time should be short enough to prevent the fused composition from flowing away from the surface. On the other hand, with a powder coating composition having low penetrability, it is necessary that the gellating time thereof should be long enough to permit the fused composition to penetrate in the gaps of the coils, since otherwise air will be entrapped in the coil windings so that cracks will be formed when subjected to thermal shocks or heat cycles.

JP-A-59-51910 (Tokkyo Kokai) discloses a powder coating composition affording a flexible coating whose flexibility is maintained at low temperatures of, for example, −20° C. The composition includes (A) 100 parts by weight of a rubber-modified epoxy resin obtained by reaction of 100 parts by weight of a diglycidyl ether of bisphenol A with 50–80 parts by weight of a carboxyl terminated acrylonitrile-butadiene copolymer, (B) 3–10 parts by weight of dicyanodiamide, and (C) 0.1–2 parts by weight of a curing accelerator, such as imidazole, having a melting point of 140° C. or more and a particle size of less than 5 μm. This Japanese Kokai publication is silent with respect to applicability of the composition to the packaging and encapsulation of rotors, the consolidation of coil windings and the bonding of the coils to the rotor cores. The known powder coating composition has been found to be not unsatisfactory when utillized in such applications.

The present invention has been made with the foregoing problems of the known powder coating compositions in view. In accordance with the present invention there is provided a powder coating composition comprising:

(a) 100 parts by weight of a mixed epoxy resin having an epoxy equivalent of 800–2000 and including (a-1) a diglycidyl ether of bisphenol A having an epoxy equivalent of 180–2500 and (a-2) a rubber-modified epoxy resin having an epoxy equivalent of 180–2500 and obtained by reaction of a diglycidyl ether of bisphenol A with a carboxyl terminated acrylonitrile-butadiene copolymer;

(b) a mixed curing agent consisting of (b-1) 0.05–5 parts by weight of an imidazole compound, (b-2) 0.5–10 parts by weight of dicyanodiamide and (b-3) 1–10 parts by weight of a dihydrazide of a dibasic carboxylic acid; and (c) 50–100 parts by weight of silica.

The rubber-modified epoxy resin to be used as Component (a-2) is obtained by reaction of a diglycidyl ether of bisphenol A with a carboxyl terminated acrylonitrile-butadiene copolymer which may be expressed by the following general formula:

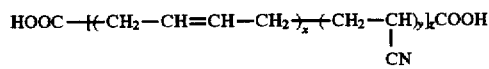

wherein x, y and z are integers. Preferably x, y and z are such integers that the copolymer has a molecular weight of 2500–5000. The copolymer preferably has an acrylonitrile content of about 10–30% by weight and an average carboxyl group number of 1.6–2.4 per one molecule.

The rubber-modified epoxy resin (a-2) preferably has a softening point of 50°–100° C. The epoxy equivalent of the mixed epoxy resin (a) should be 800–2000. When the epoxy equivalent is below 800 the powder epoxy resin causes blocking during storage and the viscosity of the powder coating composition when fused becomes so low that it drips and flows down from the material to be coated. Too high an epoxy equivalent in excess of 2000, on the other hand, is disadvantageous because the powder coating composition becomes poor in penetrability when fused so that coil windings are not sufficiently bonded to the rotor core.

The proportion of the diglycidyl ether of bisphenol A (Component (a-1)) in the mixed epoxy resin (a) is preferably such that the mixed epoxy resin has a content of the acrylonitrile-butadiene copolymer of 1–5% by weight, more preferably 1–4% by weight. Preferably, the weight ratio of Component (a-1) to Component (a-2) is in the range of 1:4 to 3:2.

The mixed epoxy resin (Component (a)) may contain one or more diglycidyl type-epoxy resins other than Components (a-1) and (a-2), if desired. Such additional epoxy resins include, for example, a diglycidyl ether of bisphenol F, a diglycidyl ester of dimer acid, diglycidyl ether of polyalkylene glycol, a diglycidyl ether of bisphenol S, a diglycidyl ester of hexahydrophthalic acid, a hydrogenated diglycidyl ether of bisphenol A. The amount of such an additional epoxy resin is up to 20% by weight, generally up to 10% by weight of the mixed epoxy resin (Component (a)). These additional epoxy resins can improve the fluidity of the coating composition and the adhesion strength, toughness of the coatings.

Further, epoxy resins with 3 or more epoxy groups may be incorporated into the mixed epoxy resin. These may be, for example, an o-creasol novolak epoxy resin, a phenol novolak epoxy resin, a triglycidyl ether epoxy resin (e.g. those of cyanuric acid and triphenylpropane) and a tetraglycidyl ether epoxy resin (e.g. epoxydated bisresolcinol F and epoxydated tetraoxytetraphenylethane). The amount of such a polyglycidyl ether type epoxy resin is up to 30% by weight, generally 15% by weight of the mixed epoxy resin (Component (a)).

A mixed curing agent (Component (b)) consisting of (b-1) 0.05–5 parts by weight, preferably 0.1–3 parts by weight of an imidazole compound, (b-2) 0.5–10 parts by weight, preferably 2–5 parts by weight of dicyanodiamide and (b-3) 1–10 parts by weight, preferably 3–7 parts by weight of a dihydrazide of a dibasic carboxylic acid is used in the present invention as a hardener of 100 parts by weight of the mixed epoxy resin (Component (a)).

The imidazole compound (Component (b-1)) may be, for example, 2-methylimidazole, 2-phenylimidazole, 2-undecylimidazole, 1-cyanoethyl-2-undecylimidazole, 1-cyanoethyl-2-methylimidazole trimellitate, 1-cyanoethyl-2-phenylimidazole trimellitate and 2,4-diamino-6-(2'-methylimidazolyl-(1'))ethyl-s-triazine. These compounds may be used by themselves or as a mixture of two or more. The finer the imidazole compound, the better becomes its performance. The particle size of the imidazole compound is preferably such as at least 95% by weight thereof is finer than 200 mesh (Tyler). A liquid imidazole compound may be used as long as the resulting composition can be in the form of powder.

Dicyanodiamide (Component (b-2)) preferably has a particle size such that at least 97% by weight thereof is finer than 200 mesh. The finer the particle size of dicyanodiamide, the better becomes its performance.

The dihydrazide (Component (b-3)) may be, for example, adipic acid dihydrazide, isophthalic acid dihydrazide and cebacic acid dihydrazide. The finer the particle size of the dihydrazide, the better becomes its performace. The particle size of the dihydrazide is preferably such that at least 95% by weight thereof is finer than 200 mesh.

In the powder coating composition according to the present invention, silica is used as a filler. Crystalline silica and fused silica may be suitably used. The particle size of silica (Component (c)) is preferably 2–10 μm, more preferably 4–6 μm. It is important that silica should be used in an amount of 50–100 parts by weight per 100 parts by weight of the mixed epoxy resin (Component (a)). Silica serves to improve the resistance to thermal shock (heat cycles) of the coating. One or more other suitable fillers, such as mica and calcium carbonate, may be used in conjunction with silica, if desired.

The powder coating composition of the present invention may additionally contain one or more additives such as a leveling agent (e.g. acrylic acid ester oligomer) and a pigment.

The powder coating composition may be prepared in any known manner. For example, respective ingredients are mixed with each other and the mixture is fused, commingled and extruded with an extruder. The exrudates are then solidified and pulverized to obtain a powder coating composition.

The powder coating composition according to the present invention gives a coating having a high adhesion to a solid surface such as a metal surface and is suitably used for insulation of electric and electronic parts. Especially, the coating composition may be advantageously utilized for fixing coil windings of rotors of motors and generators and for packaging or encapsulating electronic and electric parts.

The following examples will further illustrate the present invention.

EXAMPLE

Epoxy resin powder compositions having the formulations shown in Table 1 were prepared. Each of the compositions was then tested for evaluating performances thereof in the manner descrived hereinafter. The results are summarized in Table 2. In Table 1, the amounts are part by weight and the trademarks and abbreviations are as follows:

EPIKOTE 1002: Diglycidyl ether of bisphenol A; manufactured by Yuka-Shell Epoxy Inc.; epoxy equivalent: 600–700

EPIKOTE 1007: Diglycidyl ether of bisphenol A; manufactured by Yuka-Shell Epoxy Inc.; epoxy equivalent: 1750–2200

EPOMIC SR-35: Acrylonitrile-butadiene copolymer rubber-modified epoxy resin; manufactured by Mitsui Petroleum Industries, Ltd.; epoxy equivalent:960–1060; rubber content: 5% by weight 2MZ-A: 2,4-Diamino-6-(2'-methylimidazolyl(1'))-ethyl-s-triazine; average particle size: 20 μm; manufactured by Shikoku Kasei Co., Ltd.

ADH: Adipic acid dihydrazide; average particle size: 5 μm; manufactured by Nippon Hydrazine Kogyo K. K.

The average particle size of dicyanodiamide used is 10 μm, that of calcium carbonate is 6 μm, that of mica is 8 μm, that of crystalline silica is 4 μm and that of fused silica is 4 μm.

The epoxy equivalents of the mixed epoxy resins are 980 in the case of Sample No. 1 and 870 in the case of Sample Nos. 2–14.

The hardening of the coating composition in the tests is performed at 200° C. for 30 minutes in the case of Sample Nos. 1 and 2, at 200° C. for 60 minutes in the case of Sample Nos. 3 and 4, and at 180° C. for 30 minutes in the case of Sample Nos. 5–14.

The test methods are as follows:

(1) Adhesion Strength

A pair of mild steel plates preheated to 150° C. and having a size of 100 mm×20 mm×3 mm are arranged in series with their end portions being overlapped. The overlap portion (12 mm×20 mm) is provided with a sample powder composition. The assembly is fixed with a pinch cock and is heated to harden the composition. Then, the bonded plates are longitudinally pulled with a tensile strength tester at a rate of 5 mm/minute to measure the adhesion strength under shear.

(2) Tensile Strength and Elongation

According to the procedure specified in JIS K-6911, a sample powder composition is applied over a plate by the fluidized bed immersion method and is hardened to form a coating having a thickness of 0.3–0.5 mm. The coating is separated from the plate and is pulled with a tensile strength tester at a rate of 5 mm/minute to measure the tensile strength and elongation.

(3) Resistance to Thermal Shock

A sample coating composition is applied to a mild steel plate having a size of 60 mm×60 mm×3 mm by the fluidized bed immersion method and is hardened to form a coating with a thickness of 03–0.5 mm. The coated plate is placed for 30 minutes in a cooler maintained at −40° C. and, then, for 30 minutes in a heater maintained at 100° C. Such cooling and heating steps are cyclically repeated until a crack is formed in the coating while counting the number of cycles. The thermal shock resistance is evaluated on the basis of the following ratings:

A: 30 or more cycles

B: 10–30 cycles

C: less than 10 cycles (4) Appearance of Coating

A 20 mm thick iron plate having a hole with a diameter of 5 mm and a depth of 10 mm is preheated to 150° C. The hole is the filled with a predetermined amount of a sample coating composition and the composition is hardened while maintaining the plate in a horizontal state. The coating on the hole is evaluated as follows:

A: The hardened mass is present just on the hole and the coating has a diameter of less than 10 mm. No air bubbles are formed.

B: The coating is spread and has a diameter of over 10 mm.

C: The center of the coating is depressed due to shrinkage. Or air bubbles are present.

The amount of the sample composition applied to the hole is 1.2 times the weight required for just filling the hole. This weight is calculated based on the true density of the sample composition.

(5) Penetrability

The testpiece obtained by the Test (4) above is cut to observe the inside of the hole. Penetrability is rated as follows:

A: The hole is completely filled with the hardened composition. No air bubbles are present.

B: The hole is completely filled with the hardened composition but air bubbles are formed.

C: Air bubbles are formed. Corners of the hole remain unfilled with the hardened composition.

(a) 100 parts by weight of a mixed epoxy resin having an epoxy equivalent of 800–2000 and including (a-1) diglycidyl ether of bisphenol A having an epoxy equivalent of 180–2500 and (a-2) a rubber-modified epoxy resin having an epoxy equivalent of 180–2500 and obtained by reaction of a diglycidyl ether of bisphenol A with a carboxyl terminated acrylonitrile-butadiene copolymer, wherein said copolymer is 1–4 wt. % of said mixed epoxy resin;

(b) a mixed curing agent consisting of (b-1) 0.05–5 parts by weight of an imidazole compound, (b-2) 0.5–10 parts by weight of dicyanodiamide and (b-3) 1–10 parts by weight of a dihydrazide of a dibasic carboxylic acid; and (c) 50–100 parts by weight of silica.

2. A powder coating composition as claimed in claim 1 wherein the dihydrazide (b-3) is adipic acid dihydrazide.

3. A powder coating composition as claimed in claim 1 wherein dicyanodiamide (b-2) has such a particle size distribution so that at least 97% by weight thereof has a particle size finer than 200 mesh.

4. A powder coating composition as claimed in claim 1 wherein the amounts of the imidazole compound (b-1), dicyanodiamide (b-2) and the dihydrazide (b-3) are 0.1–3

| Composition Sample No. | 1* | 2* | 3* | 4* | 5* | 6* | 7* | 8* | 9 | 10 | 11* | 12* | 13 | 14 |
|---|---|---|---|---|---|---|---|---|---|---|---|---|---|---|
| EPIKOTE 1002 | 50 | 25 | 25 | 25 | 25 | 25 | 25 | 25 | 25 | 25 | 25 | 25 | 25 | 25 |
| EPIKOTE 1007 | 50 | — | — | — | — | — | — | — | — | — | — | — | — | — |
| EPOMIC SR-35 | — | 75 | 75 | 75 | 75 | 75 | 75 | 75 | 75 | 75 | 75 | 75 | 75 | 75 |
| Crystalline Silica | 80 | 80 | 80 | 80 | 80 | 80 | — | — | — | 80 | 40 | — | 80 | 80 |
| Fused Silica | — | — | — | — | — | — | — | — | 80 | — | — | — | — | — |
| Calcium Carbonate | — | — | — | — | — | — | 80 | — | — | — | 40 | 40 | — | — |
| Mica | — | — | — | — | — | — | — | 80 | — | — | — | 40 | — | — |
| Dicyanodiamide | — | — | 5 | — | 5 | — | 4 | 4 | 4 | 4 | 4 | 1 | 2 | 5 |
| 2MZ-A | 1 | 1 | — | — | 1 | 1 | 1 | 1 | 1 | 1 | 1 | 1 | 1 | 1 |
| ADH | — | — | — | 5 | — | 5 | 5 | 5 | 5 | 5 | 5 | 5 | 7 | 3 |
| Adhesion Strength (Kg/cm$^2$) | 2.3 | 2.5 | 3.1 | 2.8 | 3.8 | 3.3 | 3.8 | 4.0 | 4.1 | 4.1 | 3.7 | 3.7 | 3.9 | 3.8 |
| Tensile Strength (Kg/cm) | 5.5 | 6.1 | 6.0 | 5.7 | 6.0 | 6.5 | 6.6 | 6.5 | 6.9 | 7.5 | 7.1 | 6.9 | 7.3 | 7.0 |
| Elongation (%) | 3.0 | 3.3 | 3.4 | 3.9 | 3.3 | 4.0 | 3.6 | 3.9 | 3.8 | 4.2 | 3.8 | 3.8 | 4.0 | 3.9 |
| Thermal Shock Resistance | C | C | B | B | C | A | B | A | A | A | B | B | A | A |
| Appearance of Coating | B | A | C | C | B | B | B | A | A | A | B | A | A | A |
| Penetrability | C | C | A | A | B | B | B | C | A | A | B | C | A | A |

*Comparative Sample

What is claimed is:

1. A powder coating composition having good penetrability and suitability for impregnation of rotor coil windings, said composition consisting essentially of:

parts by weight, 2–5 parts by weight and 3–7 parts by weight, respectively, per 100 parts by weight of the mixed epoxy resin (a).

* * * * *